United States Patent
Weber et al.

(10) Patent No.: US 11,254,797 B2
(45) Date of Patent: Feb. 22, 2022

(54) PET REGRANULATE HAVING HIGH INTRINSIC VISCOSITY AND METHOD FOR THE PRODUCTION THEREOF

(71) Applicant: ALPLA WERKE ALWIN LEHNER GMBH & CO. KG, Hard (AT)

(72) Inventors: Andreas Weber, Thuringen (AT); Franz Michael Lässer, Lochau (AT); Michael Schranz, Rankweil (AT)

(73) Assignee: ALPLA WERKE ALWIN LEHNER GMBH & CO. KG

( * ) Notice: Subject to any disclaimer, the term of this patent is extended or adjusted under 35 U.S.C. 154(b) by 87 days.

(21) Appl. No.: 16/475,858

(22) PCT Filed: Dec. 21, 2017

(86) PCT No.: PCT/EP2017/084200
§ 371 (c)(1),
(2) Date: Jul. 3, 2019

(87) PCT Pub. No.: WO2018/127431
PCT Pub. Date: Jul. 12, 2018

(65) Prior Publication Data
US 2020/0283596 A1    Sep. 10, 2020

(30) Foreign Application Priority Data
Jan. 3, 2017   (CH) .................................... 00002/17

(51) Int. Cl.
| | |
|---|---|
| *C08J 11/26* | (2006.01) |
| *B29B 9/06* | (2006.01) |
| *B29B 17/04* | (2006.01) |
| *C08G 63/183* | (2006.01) |
| *B29K 67/00* | (2006.01) |
| *B29K 105/00* | (2006.01) |

(52) U.S. Cl.
CPC .................. *C08J 11/26* (2013.01); *B29B 9/06* (2013.01); *B29B 17/0412* (2013.01); *C08G 63/183* (2013.01); *B29K 2067/003* (2013.01); *B29K 2105/0094* (2013.01); *C08J 2367/02* (2013.01)

(58) Field of Classification Search
USPC ............... 521/48; 528/190, 193, 194, 501
See application file for complete search history.

(56) References Cited

U.S. PATENT DOCUMENTS

| | | | |
|---|---|---|---|
| 3,767,601 A | 10/1973 | Knox | |
| 2002/0141282 A1 | 10/2002 | Tanaka et al. | |
| 2009/0264545 A1* | 10/2009 | Sequeira | B29C 48/10 521/48 |
| 2013/0029068 A1 | 1/2013 | Treece et al. | |

FOREIGN PATENT DOCUMENTS

| | | |
|---|---|---|
| EP | 0422282 A1 | 4/1991 |
| EP | 0560033 A1 | 9/1993 |
| EP | 0856537 A2 | 8/1998 |
| EP | 1829914 A1 | 9/2007 |
| WO | WO9840194 A1 | 9/1998 |
| WO | WO9844029 A1 | 10/1998 |
| WO | WO0121373 A1 | 3/2001 |
| WO | WO2014162238 A2 | 10/2014 |
| WO | WO2018127431 | 7/2018 |

OTHER PUBLICATIONS

Anonymous "Efficient process technology for individual product finishing" ProTec Polymer Processing at Chinaplas 2013, Bensheim, Mar. 31, 2013 http://www.konsens.de/fileadmin/Kunden/Protec_Polymer_Processing/Protec_2013-0068_text_English.doc (retrieved on Mar. 29, 2017).

Awaja et al: "Recycling of PET", European Polymer Journal, vol. 41, Feb. 5, 2005 (Feb. 5, 2005), pp. 1453-1477, XP002768739, DOI: 10.1016/j.eurpolymj.2005.02.005.

Anonymous: "rPET for direct contact with foodstuffs, reliably produced using the OHL process", ProTec Polymer Processing at FAKUMA 2012: Oct. 16, 2012 (Oct. 16, 2012), XP002768738, http://www.konsens.de/protec.html?&no_cache=1&L=1&no_cache=1&tx_ttnews[pointer]=4&cHash=b4224b785ff40d61c76f73d6815fefa8 [retrieved on Mar. 29, 2017].

PCT International Search Report for PCT/EP2017/084200 dated Feb. 7, 2018.

PCT Written Opinion for PCT/EP2017/084200 dated Feb. 7, 2018.

PCT International Preliminary Report on Patentability for PCT/EP2017/084200 dated Jul. 9, 2019.

Lu, X.F., Hay, J.N., Isothermal crystallization kinetics and melting behaviour of poly(ethylene terephthalate), Polymer, vol. 42, Nov. 2001, pp. 9423-9431.

Härth M, Dörnhöfer A., Film Blowing of Linear and Long-Chain Branched Poly(ethylene terephthalate). Polymers, 2020; 12,1605, www.mdpi.com/journal/polymers.

Kruse, M., From Linear to Long-Chain Branched Poly(ethylene terephthalate) Reactive Extrusion, Rheology and Molecular Characterization, Universitätsverlag der TU Berlin, 2017.

* cited by examiner

*Primary Examiner* — Terressa Boykin
(74) *Attorney, Agent, or Firm* — Morris O'Bryant Compagni Cannon, PLLC

(57) ABSTRACT

The invention relates to a PET regranulate which, after modification of a granulated PET recyclate, has an intrinsic viscosity of at least 0.95 dl/g measured according to ASTM D 4603, preferably greater than 1.0 dl/g and particularly preferably between 1.1 dl/g and 1.7 dl/g and is suitable for the production of extrusion blow-molded containers.

21 Claims, No Drawings

PET REGRANULATE HAVING HIGH INTRINSIC VISCOSITY AND METHOD FOR THE PRODUCTION THEREOF

CROSS-REFERENCE TO RELATED APPLICATIONS

This application is a national phase entry under 35 U.S.C. § 371 of PCT/EP2017/084200 filed Dec. 21, 2017, which claims priority to Swiss Patent Application No. 00002/17 filed Jan. 3, 2017, the entirety of each of which is incorporated by this reference.

FIELD OF THE INVENTION

The invention relates to PET regranulate having high intrinsic viscosity and and method for the production thereof.

BACKGROUND ART

The production of plastic containers, in particular plastic bottles, for example of polyethylene or polypropylene, usually takes place in an extrusion blow molding method. Thereby, a plastic tube is extruded from a tube head, which is introduced into a blow-molding tool with a cavity, inflated via a blow mandrel by overpressure and thereby pressed against the inside of the cavity and cured by cooling. Due to the curing on the inside of the cavity, the blow-molded article assumes the contour of the inside of the cavity on its outside. After curing, the blow-molded article is removed from the blow-molding tool. The extrusion blow molding machines used for this purpose generally have at least one extruder for feeding and melting the plastic material. The outlet of the extruder is connected to the tube head, at the outlet nozzle of which, preferably adjustable in the opening width, the extruded tube emerges. When closing the blow-molding tool for squeezing the plastic tube introduced between its tool halves, parts of the plastic tube project on the top and the bottom, so-called slugs, which are separated in a separate work step and can be fed to the recycling stream. The plastic tube can be single-layered or multi-layered, it can be extruded as a plastic tube with viewing strips, decorative strips or related to the circumference, with several, for example, different colored segments.

The blowing station with the blow mandrel is usually arranged laterally of the tube head, wherein the blow-molding tool supplied with the extruded plastic tube must be moved into the blow station, where the blow mandrel is then usually driven into the blow mold cavity from above.

In most cases, the plastic tube is extruded vertically. Due to gravity, the plastic tube exiting at the blow nozzle is pulled downwards. However, if the material of the plastic tube is too thin, i.e. has no sufficient melt strength, it is changed in its length due to the own weight of the plastic tube such that the subsequent blowing process is no longer possible.

For the production of PET containers on extrusion blow molding machines, extrusion blow molding can only be used if the PET molding compound has the necessary melt strength, i.e. the plastic tube has a shape and consistency when the blow mold halves are closed, which leads to a hollow body during subsequent inflation and curing that meets the specified specifications. The melt strength of the PET material used in the stretch blow molding process in which the containers are formed from a preform made by injection molding, a so-called preform, does not meet the requirements for extrusion blow molding, as its intrinsic viscosity is too low and leads to the mentioned impermissible lengths of the plastic tube when used in extrusion blow molding. For extrusion blowing, the PET material must be modified accordingly.

According to the prior art, PET molding compounds are used for extrusion blow molding, which are known by short designations such as PET X (extrudable), PET G (glycol modified) and PET B (branched). In the USA, terms such as EPET, PETE or even EBM PET are common. These are PET materials specially developed for extrusion blow molding, produced quantity of which is low and therefore has a correspondingly high price. However, the PET hollow bodies produced with these PET molding compounds with the EBM method can partially not be supplied to the PET recycling stream, as they cannot be processed like standard PET during recycling.

Standard PET types are understood to be linear PET types (not branched) with a low copolymer fraction of less than 5% by weight and an intrinsic viscosity (IV) of between 0.74 and 0.86 dl/g (according to ASTM D 4603).

In US 2013/0029068 A1, a PET molding composition is proposed, which is suitable for the EBM process and is said to behave without problems in the PET recycling stream. The PET molding compound is made of PET virgin material, that is, so-called "virgin PET" or short v-PET. By definition, PET virgin material has not been extruded from fossil raw materials or renewable raw materials after its production.

Due to the low melt strength, post-consumer PET, so-called r-PET, is not suitable for use in an EBM machine. The reason for the too low melt stability of r-PET is probably due to the fact that the plastic mass is degraded again during extrusion by the repeated heat exposure and the impact of shear forces and thus the molecular weight is reduced again.

Standard PET (polyethylene terephthalate) is not suitable for extrusion blow molding due to its low melt strength. Therefore, modified PET molding compounds have been developed which have an improved melt strength. The improved melt strength can be affected among others by an extension or crosslinking of the molecular chains by adding chain extension or crosslinking additives to the PET. However, such PET molding compounds cannot be supplied to the PET recycling stream from the containers produced from a preform, as the extension and crosslinking additives are regarded as contamination of the PET recycling stream.

Post-use PET, so-called PET recyclate (r-PET), as available on the market, has an intrinsic viscosity of at most 0.88 dl/g according to ASTM D 4603 and is unsuitable for use in the extrusion blow method.

Advantages of the Invention

From the disadvantages of the described prior art, the present invention results in a PET molding compound which contains at least a certain proportion of PET recyclate and is suitable for extrusion blow molding.

DESCRIPTION OF THE INVENTION

According to a first embodiment of the invention, a PET regranulate is suggested which, after modification of a granulated PET recyclate, has an intrinsic viscosity (IV) of at least 0.95 dl/g measured according to ASTM D 4603, greater than 1.0 dl/g or between 1.1 dl/g and 1.7 dl/g and is suitable for the production of extrusion blow-molded containers.

Here, the term granulated PET recyclate is to be understood as meaning the material as it is provided for processing in the area of the stretch-blown bottles from injection-molded preforms. The PET recyclate is obtained from the post-consumer PET bottles and/or industrial wastes from PET bottle production supplied to the PET recycling stream. For this purpose, the post-consumer PET bottles and/or industrial waste from the PET bottle production are first washed and then crushed into flakes if necessary. If necessary, the flakes are washed again. Subsequently, the flakes are melted by extrusion using an extruder, the melt is pressed through a pinhole aperture to a melt strand and the melt strand is cooled in a water bath. Finally, the cooled melt strand is granulated to PET recyclate. PET regranulate means that the PET recyclate is modified in such a manner that, with the PET regranulate, an intrinsic viscosity is reached, which makes it possible to produce a container from the PET regranulate by an extrusion blow molding method. The PET regranulate is made entirely from PET recyclate without the need for adding chain extensions and/or crosslinking additives. Correspondingly, containers produced from PET regranulate by an extrusion blow molding method can be supplied to the PET recycling stream made of PET bottles. Due to the fact that the PET regranulate was made of post-consumer PET containers, the PET regranulate was extruded at least twice, thus melted twice and thereby subjected twice to shear forces and twice to heat exposure. Experience has shown that containers made from PET regranulate have a yellowish tinge which can be lightened by admixing v-PET if necessary. Here, v-PET can be admixed to a maximum of 40% by weight. Usually, between 10% by weight and 30% by weight of v-PET can be admixed, the percentage being based on the total amount of PET regranulate and v-PET. The yellowish tinge can also be covered by admixing color, such as a blue or green color. The PET regranulate thus enables the production of transparent containers in the EBM method.

According to another embodiment of the invention, the PET recyclate has an intrinsic viscosity of less than 0.8 dl/g measured according to ASTM D 4603. For the most part, the PET recyclate has an intrinsic viscosity of less than 0.74 dl/g measured according to ASTM D 4603 or between 0.74 dl/g and 0.73 dl/g. It has been shown that especially PET recyclate with such a low intrinsic viscosity is suitable to be modified to a PET regranulate with reasonable economic outlay.

According to a further embodiment of the invention, the PET regranulate, from which the PET regranulate is made, has carboxyl end groups between 30 mmol/kg and 60 mmol/kg or between 32 mmol/kg and 40 mmol/kg, and hydroxyl end groups between 30 mmol/kg and 70 mmol/kg or between 50 mmol/kg and 60 mmol/kg. It has been found that, in particular, the extrusion and melting of the PET flakes is important for the production of the PET recyclate. Through the repeated exposure to heat and shear forces of the PET flakes, which are made from post-consumer PET bottles and/or industrial wastes from PET bottle production, which have already been affected by the extrusion in an upstream production process by heat and shear forces, and the concomitant reduction in intrinsic viscosity or the molecular weight, a high number of reactive end groups is generated. Through removal of water by vacuum and heating or by heating and rinsing at atmospheric pressure with nitrogen, the carboxyl end groups bind with the hydroxyl end groups. Especially PET recyclate with carboxyl end groups between 32 mmol/kg and 40 mmol/kg and hydroxyl end groups between 50 mmol/kg and 60 mmol/kg tend to bind quickly and thus lead to a chain extension causing an increase in intrinsic viscosity. This might also be the reason why experts have not yet considered the use of PET recyclate in the EBM process.

According to a further embodiment of the invention, the modification is effected by condensation. Instead of condensing, the terms polymerization or esterification are also used. Especially this process can be carried out, for example, in a solid state polycondensation reactor=SSP (solid state polycondensation). Instead of a SSP reactor, a dryer can also be used for the condensation. The SSP process can either take place separately at a recycling plant or at the plant where the EBM production process is performed. It has been shown that PET recyclate is more reactive than v-PET and is accordingly easier to condense than v-PET. This is a great advantage because it reduces the production times.

According to a further embodiment of the invention, the PET regranulate is formed as spherical granules. Especially the formation as spherical granules, which already has the PET recyclate, can ensure that the condensation of the PET recyclated material is uniform. This ensures a homogeneous distribution of the intrinsic viscosity over the PET regranulate. Typically, the range of intrinsic viscosity of the PET regranulate in the mold as received by the customer for processing is in the range of 0.03 dl/g. As PET recyclate and PET regranulate are bulk materials, wear or repulsion by the spherical shape is largely prevented. In contrast, when pouring cylindrically shaped PET recyclate, edge repulsion generally occurs. These fragments are condensed faster. Also, the bandwidth of the intrinsic viscosity may be greater within a granule in a cylindrical configuration, as within this geometric configuration, plane surfaces and curved surfaces collide which have a different condensation behavior. As a consequence, in the case of the customer, who also finds wear and debris in the delivery, in the case of a cylinder-shaped regranulate, this can cause a broader bandwidth of the intrinsic viscosity than in the case of the spherically formed variant.

According to a further embodiment of the invention, the PET regranulate is modified by a solid phase polycondensation at a temperature between 185° C. and 230° C., between 195° C. and 220° C. or between 200° C. and 210° C. Under the above conditions, the PET recyclate can be condensed to the PET quickly and inexpensively.

According to a further embodiment of the invention, a container, in particular a bottle, is suggested, which is produced from a PET regranulate according to the above description in an extrusion blow-molding process. Extrusion-blown containers from PET regranulate containers can be labeled with the number 01 of the SPI resin identification code system and thus supplied to the normal PET recycling stream.

According to a further embodiment of the invention, the PET regranulate is food-safe. Extrusion blow-molded containers for storing food can thereby be made from the PET regranulate.

According to a further embodiment of the invention, the container can be processed to PET recyclate after use. Due to the ability to feed the container, which has been blow-molded from the PET regranulate, into the normal PET recycling stream, this container can again be processed into PET recyclate, which can be condensed to form PET regranulate.

According to a further embodiment of the invention, a method for manufacturing a PET regranulate is suggested which, by means of modification of a granulated PET recyclate, has an intrinsic viscosity of more than 0.95 dl/g measured according to ASTM D 4603, greater than 1.0 dl/g or between 1.1 dl/g and 1.7 dl/g and is suitable for the production of extrusion blow-molded containers.

According to a further embodiment of the invention, the method has the following: crushing post-consumer PET bottles and/or industrial waste from the PET bottle production into flakes, subsequent washing the flakes if necessary, subsequent melting the flakes by extruding by means of an extruder with simultaneous degradation of the intrinsic viscosity and increase of the reactive carboxyl and hydroxyl end groups, subsequent pressing the melt through a pinhole aperture to a melt strand, subsequent Cooling the melt strand, and granulating the cooled melt strand to PET recyclate.

In principle, v-PET can be admixed to the PET recyclate prior to the condensation of the PET recyclate to PET regranulate. This can take place directly in the factory where the PET recyclate is processed. The modification is affected by an increase of the average molecular weight. This is done by subjecting the PET recyclate/v-PET mixture to a solid phase polycondensation. The solid phase polycondensation is also known by the English term "solid state polycondensation" (SSP). It takes place in a corresponding solid-phase reactor, which is equipped with a stirrer, in which the granulated PET recyclate is gently mixed and heated at the same time. Thereby, water and volatile components are expelled from the submitted PET recyclate resulting in condensation reactions and thus an increase in the average molecular weight. The internal temperature of the reactor is from 200 to 220° C. In order to extract the vapors, a reduced pressure of less than 50 mbar prevails in the reactor or less than 10 mbar. The dwell time of the PET recyclate in the reactor is from 6 to 40 hours, from 10 h to 35 h, or from 15 h to 30 h, depending on the intrinsic viscosity to be achieved.

Advantageously, the modification of the PET recyclate to the PET regranulate takes place in a solid phase polycondensation reactor at an increased temperature between 185° C. and 230° C., between 195° C. and 220° C. or between 200° C. and 210° C.

According to a further embodiment of the invention, the PET recyclate is subjected to the increased temperature during 6 h until 40 h, during 10 h until 35 h, or during 15 h until 30 h. Under these conditions, water and other volatile materials are removed from the PET recyclate, and a rapid chain extension takes place. The chain extension manifests itself in an increased intrinsic viscosity. The thermal treatment of the PET recyclate is carried out until the desired—compared to the starting material—increased intrinsic viscosity of the PET regranulate is reached. An intrinsic viscosity between 1.0 dl/g and 1.7 dl/g measured according to ASTM D 4603 is desireable with the PET granulate.

According to a further embodiment of the invention, the PET recyclate in the solid phase condenser reactor is exposed to a reduced pressure of less than 50 mbar or less than 10 mbar.

In the case that the reactivity of the PET recyclate is insufficient, reactive additives, e.g. ethylene glycol and/or terephthalic acid and/or isophthalic acid and/or the esters thereof (e.g., terephthalic acid dimethyl ester) can be added. E.g., molecules that function as chain extenders (extender), can be admixed, or those that are capable of bonding two molecules together (branching). However, because additives are expensive and their use jeopardizes the recyclability of the plastic, the use of additives is however expediently omitted.

The average molecular mass and/or the intrinsic viscosity of the PET recyclate material used is advantageously increased by at least 20%, or by at least 25%, through the modification to PET regranulate.

Advantageously, for the production of containers with a volume of between 100 ml and 300 ml, the PET recyclate is advantageously modified in such a way that the intrinsic viscosity of the PET regranulate measured according to ASTM D 4603 is between 0.95 dl/g and 1.3 or between 1.0 dl/g and 1.2 dl/g. For the production of containers with a volume between 250 ml and 1000 ml, the PET recyclate is modified such that the intrinsic viscosity of the PET regranulate measured according to ASTM D 4603 is between 1.1 dl/g and 1.5 dl/g or between 1.2 dl/g and 1.4 dl/g.

For the production of containers with a volume between 750 ml and 5000 ml, the r-PET is modified such that the intrinsic viscosity of the PET regranulate measured according to ASTM D 4603 is between 1.2 dl/g and 1.6 dl/g or between 1.3 dl/g and 1.6 dl/g.

Conveniently, the PET recyclate is melted and granulated prior to modification, wherein the water content of the PET recyclate is set between 100 ppm and 5000 ppm or between 300 ppm and 3000 ppm. By setting a certain water content during the granulation process, the degradation reactions of the PET can be influenced in a targeted manner, as the speed of the degradation reactions increases rapidly with a higher water content. Accordingly, the reactivity of the PET recyclate and its tendency to chain formation reactions can be significantly influenced in a subsequent SSP process.

A person skilled in the art will appreciate that features of devices, where appropriate, may also be features of methods and vice versa.

The invention claimed is:

1. Polyethylene terephthalate (PET) regranulate suitable for forming extrusion blow-molded containers, the PET regranulate at least partially formed from a modified granulated PET recyclate, wherein modification of the granulated PET recyclate is obtainable by condensation of a granulated PET recyclate by crushing post-consumer PET bottles or industrial waste from PET bottle production into flakes, and subsequently melting the flakes by extruding the flakes with an extruder with simultaneous degradation of the intrinsic viscosity and increase of the reactive carboxyl and hydroxyl end groups, using PET recyclate which has carboxyl end groups between 30 mmol/kg and 60 mmol/kg and hydroxyl end groups between 30 mmol/kg and 70 mmol/kg and, prior to modification of the PET recyclate to form the PET regranulate, setting a water content of the PET recyclate to between 100 ppm and 5000 ppm and effecting condensing by a solid phase polycondensation at a temperature between 185° C. and 230° C. and without adding chain extensions or crosslinking additives, such that the PET regranulate has an intrinsic viscosity of at least 1.0 dl/g measured according to ASTM D 4603.

2. The PET regranulate of claim 1, wherein the PET regranulate has an intrinsic viscosity between 1.1 dl/g and 1.7 dl/g.

3. The PET regranulate of claim 1, wherein the PET recyclate has an intrinsic viscosity of less than 0.8 dl/g measured according to ASTM D 4603.

4. The PET regranulate of claim 1, wherein the PET recyclate has carboxyl end groups between 32 mmol/kg and 40 mmol/kg and hydroxyl end groups between 50 mmol/kg and 60 mmol/kg.

5. The PET regranulate of claim 1, wherein the PET regranulate comprises spherical pellets.

6. The PET regranulate of claim 1, wherein the condensing is effected by a solid phase polycondensation at a temperature between 200° C. and 210° C.

7. The PET regranulate of claim 1, wherein the PET regranulate is food-safe.

8. A polyethylene terephthalate PET container formed by an extrusion blow-molded process, the PET container formed from a PET regranulate, wherein the PET regranulate is obtainable by condensation of a granulated PET recyclate by crushing post-consumer PET bottles or industrial waste from PET bottle production into flakes, and subsequently melting the flakes by extruding the flakes with an extruder with simultaneous degradation of the intrinsic viscosity and increase of the reactive carboxyl and hydroxyl end groups, using PET recyclate which has carboxyl end groups between 30 mmol/kg and 60 mmol/kg and hydroxyl end groups between 30 mmol/kg and 70 mmol/kg and, prior to modification of the PET recyclate to form the PET regranulate, setting a water content of the PET recyclate to between 100 ppm and 5000 ppm and effecting condensing by a solid phase polycondensation at a temperature between 185° C. and 230° C. and without adding chain extensions and/or crosslinking additives, wherein:
- for the production of containers with a volume of between 100 ml and 300 ml, the PET recyclate is modified in such a way that the intrinsic viscosity of the PET regranulate measured according to ASTM D 4603 is between 1.0 dl/g and 1.2 dl/g;
- for the production of containers with a volume between 250 ml and 1000 ml, the PET recyclate is modified such that the intrinsic viscosity of the PET regranulate measured according to ASTM D 4603 is between 1.1 dl/g and 1.5 dl/g; or
- for the production of containers with a volume between 750 ml and 5000 ml, the PET recyclate is modified such that the intrinsic viscosity of the PET regranulate measured according to ASTM D 4603 is between 1.2 dl/g and 1.6 dl/g.

9. The PET container of claim 8, wherein the PET container comprises a bottle.

10. The PET container of claim 8, wherein the PET container is processed into PET recyclate after use.

11. A method of producing a PET regranulate for forming extrusion blow-molded containers, comprising:
- modifying a granulated PET recyclate, wherein modification of the granulated PET recyclate is obtainable by condensation of a granulated PET recyclate by crushing post-consumer PET bottles or industrial waste from PET bottle production into flakes; and
- melting the flakes by extruding the flakes with an extruder with simultaneous degradation of the intrinsic viscosity and increase of the reactive carboxyl and hydroxyl end groups;
- using PET recyclate which has carboxyl end groups between 30 mmol/kg and 60 mmol/kg and hydroxyl end groups between 30 mmol/kg and 70 mmol/kg and prior to modification of the PET recyclate to form the PET regranulate;
- setting a water content of the PET recyclate to between 100 ppm and 5000 ppm; and
- effecting condensation by a solid phase polycondensation at a temperature between 185° C. and 230° C. and without adding chain extensions or crosslinking additives, such that the PET regranulate is formed with an intrinsic viscosity of at least 0.95 dl/g measured according to ASTM D 4603.

12. The method of claim 11, wherein the intrinsic viscosity is between 1.1 dl/g and 1.7 dl/g.

13. The method of claim 11, further comprising:
- washing the flakes as needed;
- pressing the melted flakes through a pinhole aperture to form a melt strand;
- cooling the melt strand; and
- granulating the cooled melt strand into the PET recyclate.

14. The method of claim 11, wherein the PET recyclate has an intrinsic viscosity of less than 0.8 dl/g.

15. The method of claim 11, further comprising modifying the PET recyclate in a solid phase polycondensation reactor at an increased temperature between 195° C. and 220° C.

16. The method of claim 11, further comprising modifying the PET recyclate in a solid phase polycondensation reactor at an increased temperature between 200° C. and 210° C.

17. The method of claim 16, further comprising subjecting the PET recyclate to the increased temperature for 6 to 40 hours.

18. The method of claim 16, further comprising subjecting the PET recyclate to the increased temperature for 15 to 30 hours.

19. The method of claim 15, further comprising subjecting the PET recyclate in the solid phase polycondensation reactor to a negative pressure of less than 50 mbar.

20. The method of claim 15, further comprising subjecting the PET recyclate in the solid phase polycondensation reactor to a negative pressure of less than 10 mbar.

21. The method of claim 11, further comprising setting a water content of the PET recyclate to between 300 ppm and 3000 ppm prior to forming the PET regranulate.

* * * * *